Jan. 28, 1936.  R. E. CHOATE ET AL  2,029,093
WAGON
Filed Nov. 16, 1932    2 Sheets-Sheet 1

INVENTORS
ROY E. CHOATE
HAROLD N. GRAVES
WILLIAM I. LEECH
BY Flournoy Corey. ATTY.

Jan. 28, 1936.   R. E. CHOATE ET AL   2,029,093
WAGON
Filed Nov. 16, 1932   2 Sheets-Sheet 2
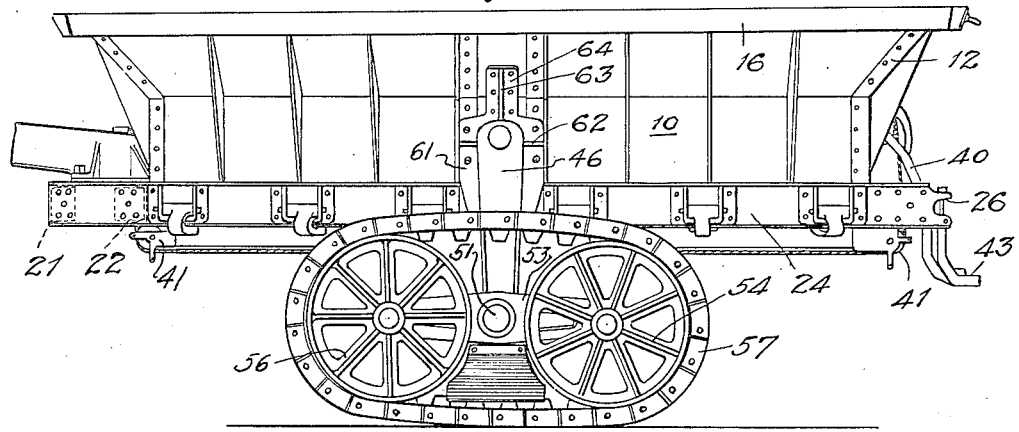
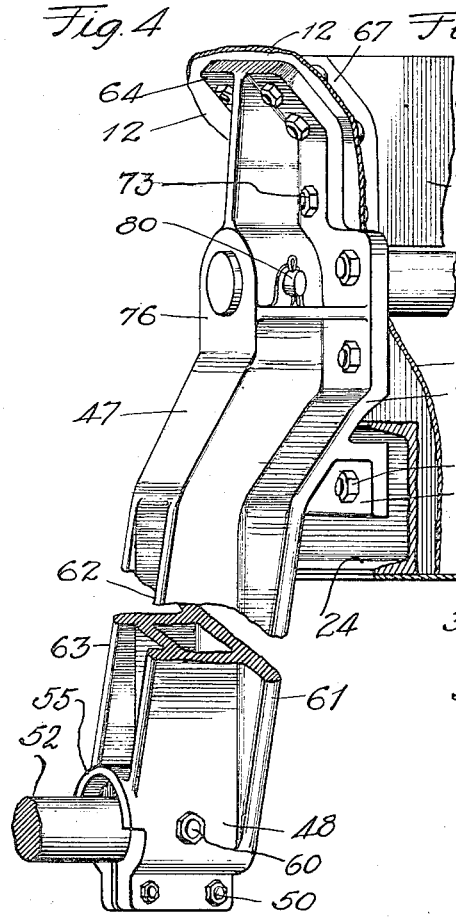
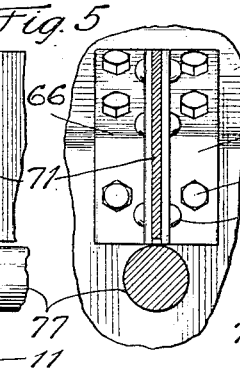
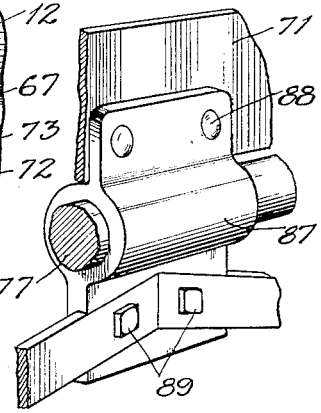
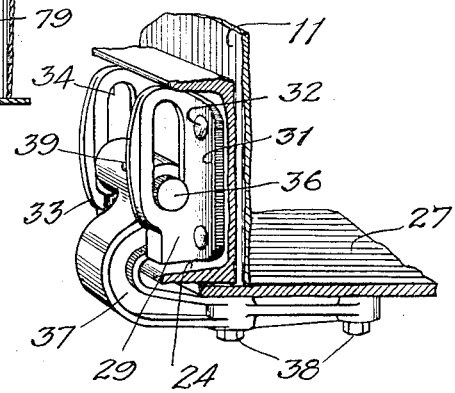
INVENTORS
ROY E. CHOATE
HAROLD N. GRAVES
WILLIAM I. LEECH
BY Flournoy Corey. ATTY.

Patented Jan. 28, 1936

2,029,093

UNITED STATES PATENT OFFICE 2,029,093

WAGON

Roy E. Choate, Harold N. Graves, and William I. Leech, Cedar Rapids, Iowa, assignors to La Plant-Choate Manufacturing Co. Inc., Cedar Rapids, Iowa, a corporation of Delaware Application November 16, 1932, Serial No. 642,864

6 Claims. (Cl. 298—35)

This invention relates to wagons and has particular relation to wagons suitable for the haulage of bulk materials such as dirt, and the like.

Wagons of the type in which we are now interested are quite large and heavy and are usually constructed of metal. It is the usual practice in constructing wagons of this character to provide a large heavy rectangular frame and to support this frame by means of brackets on the lower ends of which wheels or link tread belts are rotatably mounted. A box for carrying the materials is mounted on the frame. Doors are provided in the bottom of the box to permit unloading of the material.

The wagons above described are not altogether satisfactory for the reason that the frames and brackets sometimes break and must be of very heavy expensive construction. The boxes or hoppers in which the material is carried are so shaped that when the doors are open the material will not be freely discharged, but often forms a self-supporting arch which must be shaken loose by hand.

We have observed these difficulties and shortcomings of the devices of the prior art and after considerable investigation and thought, have reached the conclusion that to remedy these difficulties, an entirely new conception of the wagon structure must be employed. Our concept of a wagon for hauling materials is that of a hopper which is as large as possible and as nearly square in plan as possible without interfering with the maneuverability of the vehicle. The hopper preferably is a combination of straight and flaring sides adequately braced to form a truss-like structure and this box or hopper is supported directly on sturdy legs upon which wheels or link tread belts are rotatably mounted. Since the hopper is of stiff material well braced and since the legs and the bearings of the legs on the hopper are large and strong, torsional or bending stresses are readily resisted. A framework is employed in our new and novel structure but its chief purpose is merely to act as a means for coupling the wagon to a tractor or other prime mover and to other wagons.

In a device constructed according to our invention, when the doors are opened the load discharges freely and completely from the wagon. This result is secured by a new and novel construction of the box or hopper and by devising a bracing structure between the supporting legs which does not interfere with discharge of the load.

A general object of our invention is to provide a new and novel wagon structure particularly well suited for the haulage of heavy bulk materials.

A more specific object of our invention is to provide a wagon in which the supporting legs are fastened directly to the hopper.

Another object of our invention is to provide a wagon in which materials carried in the wagon may be discharged therefrom freely and completely on opening the doors.

Another object of our invention is to provide a new and improved hinging structure for the doors.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claims without departing from the spirit of the invention.

In said drawings:

Figure 3 is a side elevational view of the wagon in perspective showing various structural parts of the wagon such as the means for fastening the tongue to the wagon, the hinges for the doors, and the step for the operator.

Figure 4 is a view in enlarged perspective showing one of the legs upon which the wagon is supported and how it is secured to the wagon box.

Figure 5 is a view, partly in elevation and partly in section, taken from inside the wagon, and showing the means used for bracing the inside of the hopper and for securing the legs to the hopper.

Figure 6 is a view in perspective of the means employed for tying together the bracing members located inside the hopper, and Figure 7 is a view in perspective of one of the door hinges.

Figure 1:
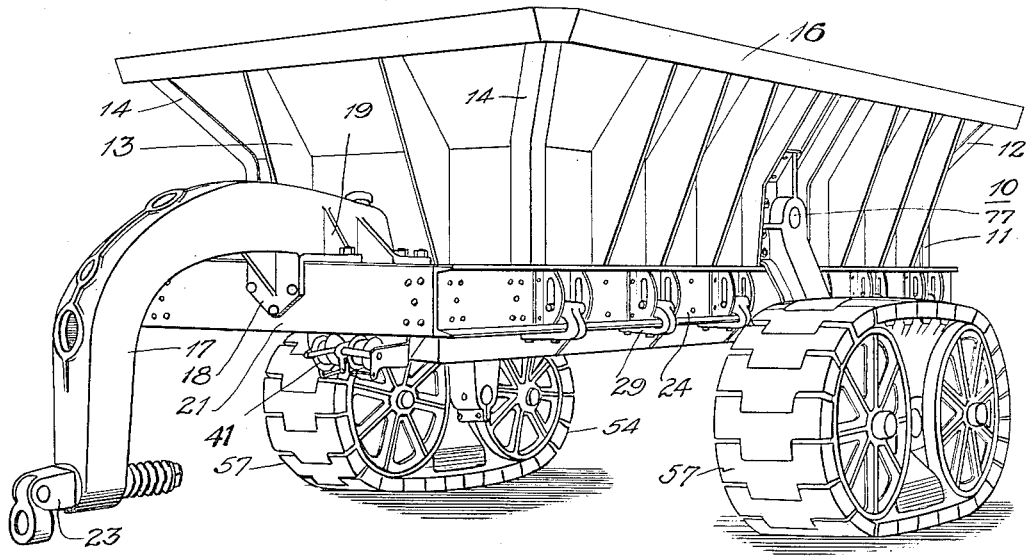
Figure 1 is a view in perspective of a wagon constructed according to one embodiment of our invention.
Figure 2:
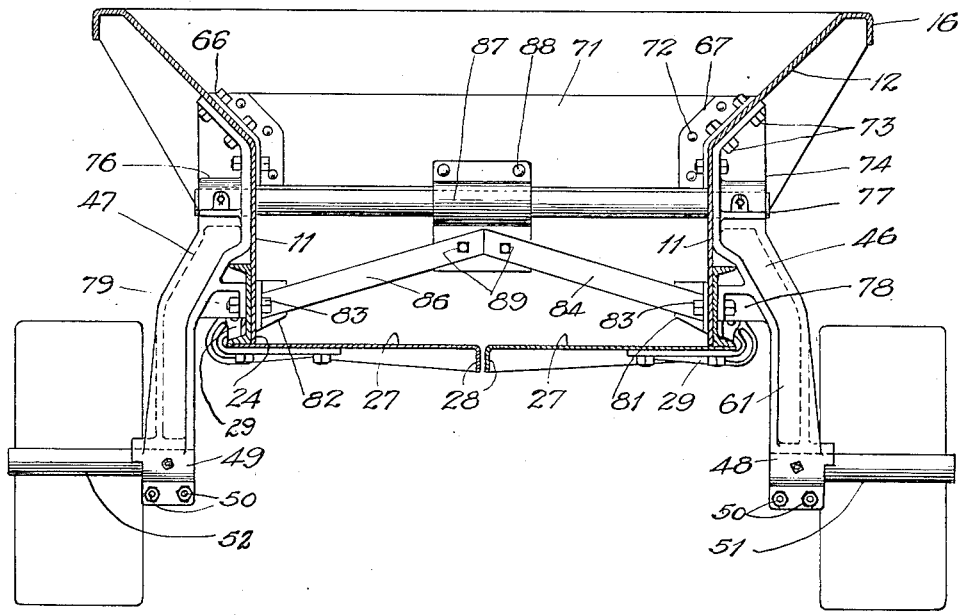
Figure 2 is a view in section taken substantially along a plane passing transversely through the center of the wagon.

Referring now to the drawings and particularly to Figures 1, 2, and 3, there is shown at 10 generally a box or hopper rectangular in plan view with the lower portions of the box in substantially vertical position, and the upper portions having sloping sides to form flareboards at both the sides and ends. The lower portion 11 of the hopper may be termed the box while the upper portion 12 may be termed the flareboards. The sides and ends of the hopper are reinforced by means of triangular plates or gussets 13 which are fastened to the hopper at spaced intervals with the apex of the triangles at the junction of the box 11 and the flareboards 12. Plates or angle irons 14 are used for reinforcing and stiffening the corners of the hopper. The upper edge of the hopper on all four sides is turned over and downwardly as shown at 16 to form a flange which acts as an additional stiffening means. It is to be noted that the combination of a vertically-extending walled lower portion and an angularly extending walled upper portion, together with the reinforcing gussets and plates, makes a tremendously strong truss structure well able to withstand bending and torsional stresses in all directions. It is apparent that not only does the combination of straight and flared walls form an extremely strong and sturdy structure but that the straight walls of the lower part of the structure permit material carried by the wagon to be discharged quickly and completely when the doors are opened. This feature will be hereinafter more fully explained.

The extreme lower portion of the box is entirely surrounded by channel beam members 21, 22, 24, and 26, which form a rectangle, both ends of which extend outwardly to points substantially below the outermost ends of the flanged tops of the hopper. A curved or arched tongue 17 is provided with various brackets 18 and 19 in order that it may be securely fastened to the crossbeams 21 and 22 which constitute the front end of the frame, and the lower outer end of the tongue 17 is provided with coupling means 23 to permit the wagon to be attached to a tractor or other prime mover. The rear ends of the side frame members 24 are connected by means of a casting 26 which encloses the rear end of the hopper and completes the rectangular framework.

The doors 27, which are long rectangular plates flanged for stiffness at their inner sides as shown at 28, are swingingly attached to the side frame members by means of a series of U-shaped brackets 29. These brackets, one of which is shown in Figure 7, are provided with a pair of transversely-extending flanges 31 which may be secured to the frame members 24 and the lower portion 11 of the box as by means of rivets 32. The brackets 29 are provided with a pair of outwardly extending ears 33 having vertically-extending slotted portions 34 in which a transversely-extending shaft 36 may be slidingly engaged for vertical movement. A J-shaped hinge member 37 is attached by means of the long arm thereof to the plates 27 as by means of bolts 38. The short arm of the hinge member 37 is securely fastened to the shaft 36 by means of a locking pin 39. It may readily be understood that the doors 27 will be hinged on the hinge member 37 which has pivotal engagement with the bracket 29 by means of the pin or shaft 36, and that the doors may move upwardly at their outer sides to make a tight closure of the bottom of the hopper when a force is applied upwardly against the doors. The slots 34 not only permit any desirable upward movement of the outer sides of the doors 27, but also permit the doors to be driven upwardly for several inches by any obstacles they encounter while being opened or while in the opened position.

The doors 27, of course, when released swing downwardly and outwardly about the hinges 37 to release the load. When the load is discharged, the doors are closed by means of a winch the operating handle of which is indicated at 40 (Figure 3). The cable runs over suitable pulleys 41 beneath the opposite inner ends of the doors 27 and over a pulley (not shown) at the tongue end of the wagon. Winding up of the cable causes the cable to be drawn up against the pulleys 41 to close the doors. When the doors have been closed a latch (not shown) on the winch is set to hold them in the closed position. Release of the latch of the winch permits the winch to unwind, thus releasing the cable to permit the doors to swing open and discharge any load carried by the wagon. The operating handle 40 is adapted to be actuated by an operator who stands on a step 43 on the cross beam 26 of the frame. This door operating mechanism is of the usual construction and thus need not be further shown and explained.

The hopper 10 is supported on complementary supporting legs 46 and 47, which engage the outside of the box and flareboards at substantially the midpoint of the length of the wagon. The lower ends of the legs 46 and 47 are provided with clamping members 48 and 49 in which stub shafts 51 and 52 are clamped by means of bolts 50. Cupped flanges 55 project out over the inner ends of the shafts 51 to form with cooperating parts of the frame 53 a dirt proof joint and the shafts 51 are locked in place by means of bolts 60. As illustrated in Figure 3, the stub shafts 51 and 52 serve as mounting means for frames 53 upon which the wheels 54 and 56 of a link belt or crawler track are mounted. The wheels, in accordance with the usual practice, act as pulleys for link belts 57. There are two of these link belts or crawlers, one on each side of the wagon as illustrated in Figures 1 and 2. Wide tread wheels or any other suitable type of link belt treads may be employed.

The legs 46 and 47 are box-like in cross section and are provided with wide flanges 61 on their inner faces and with reinforcing fins 62 and 63 so that the legs are adequately braced and provided with large bearing surfaces well adapted to fit the sides of the hopper 10. An upwardly projecting flange portion 64 of the flange 61 extends upwardly and outwardly along the flaring sides of the hopper.

Angle iron members 66 and 67 are provided on the inside of the hopper 10 and the angle irons are bent to conform to the vertical sides of the box 11 and the flaring sides of the flareboards 12. There are two pairs of angle irons 66 and 67, one pair on each side of the box and the members of each pair are spaced a sufficient distance apart that a substantially rectangular bracing plate 71 may be located transversely across the wagon and between the co-acting members of the pairs of angle irons. The rectangular plate 71 is fastened between pairs of angle irons by means of the rivets or bolts 72 and the angle irons and the flanges 64 of legs 46 and 47 are bolted to the sides of the hopper 10 by means of bolts 73 which extend entirely through the flanges 64, the wall of the box, and the angle irons 66 and 67.

Bosses 74 and 76 are provided at the upper ends of the box-like portion of the legs 46 and 47. The bosses 74 and 76 are horizontally drilled in order that a shaft 77 may be located in these openings and the sides of the box 11 are correspondingly drilled so that the shaft 77 may pass through the hopper from one leg 46 to the other leg 47 and thus act as an additional bracing means. The shaft is pinned at each end by means of pins 80 in the legs 46 and 47, and the shaft 77 is located directly below the plate 71.

Pads 78 and 79 are provided on the inner sides of the legs 46 and 47 at a position on the curved portions 75 of the legs such that when the legs are in position on the hopper, the pads 78 and 79 engage the longitudinal beams 24 which form the side members of the frame. Brackets 81 and 82 are provided on the inside of the box 11 at points adjacent to the pads 78 and 79 and these brackets are secured to the box 11 and the frame 24 by means of the bolts 83 which are used to bolt the pads to the frame. Braces 84 and 86 are secured at their outer ends to their respective brackets 81 and 82 and extend inwardly and at a slight angle upwardly to the center of the wagon box where they are joined by means of a heavy bracket or tie plate 87 which engages the plate 71 by means of rivets 88 and which encircles the shaft 77. The braces 84 and 86 are secured to the bracket 87 by means of bolts 89, or by welding or riveting as desired.

It is apparent by inspection of the drawings and consideration of the foregoing explanation, that the hopper is so constructed and so braced that a tremendously strong truss structure is secured and that this hopper is supported directly upon the legs which are in turn supported by the crawler tracks. The legs are braced by means of the bracing structure including the plate 71, the axle 77, the cross braces 84 and 86, and the tying bracket 87. The bracing structure is well above the plane of the frame 24 and of the bottom of the box so that it does not interfere with discharge of material from the wagon.

The center of mass of the bracing is substantially at the center of the box and of the mass of the load. It is to be noted that the thickness of the bracing structure is quite small in relation to its height. The bracing structure is thus well able to meet the stresses imposed by the legs on the hopper but the structure by reason of its relative thinness does not interfere with discharge of material from the wagon. The greatest stresses imposed by the legs on the hopper acts vertically and the wide plate 71, the shaft 77, and the braces 84 and 86 act to resist these stresses. The shaft 77 acts mainly to resist torsional stresses imposed by the legs and to a lesser degree the compressive stresses. The braces 84 and 86 act mainly as tension members for resisting the vertically acting stresses.

In operation material which has been loaded in the wagon may be released by opening the doors 27. By reason of the vertical sides of the box 11 the material in the box portion falls out immediately and very little resistance is afforded by the leg bracing structure. The material in the upper part of the hopper on a level with the flareboards 12 is then unsupported and since this material is not packed by the weight of material above it, this material will flow freely into the box portion of the hopper and be discharged freely therefrom.

It is to be noted that the hopper is actually suspended by means of the legs 46 and 47, and that the frame is used only for a stiffening member and as a means by which tractors and other wagons may be attached to the wagon for hauling.

While we have described certain specific embodiments of our invention, it is apparent that modifications may be made by those skilled in the art. Such modifications may be made without departing from the spirit and scope of our invention as set forth in the appended claims.

We claim as our invention:

1. In a wagon, a hopper having outwardly flared upper walls, legs secured to the vertical and the flared portions of the walls, a bracing structure disposed inside the hopper and comprising a transversely-extending plate and means for securing the plate to the walls of the hopper and to the legs, and a transverse shaft extending through the hopper and through the legs below the transverse plate.

2. In a wagon, a hopper having outwardly flared upper walls, legs secured to the vertical and the flared portions of the walls, a bracing structure disposed inside the hopper and comprising a transversely-extending plate and means for securing the plate to the walls of the hopper and to the legs, a transverse shaft extending through the hopper and through the legs below the transverse plate, pads on the inside of the legs at substantially the midpoint thereof adapted for engaging the lower portion of the walls of the hopper and braces extending from the walls of the hopper at points adjacent to the pads to a position just below the center of the shaft, and means for tying together the shaft, the inner ends of the braces, and the plate.

3. In a wagon, a hopper, legs secured to the walls of the hopper, and a bracing structure inside the hopper and extending from one leg to the other comprising a plate for resisting compressive stress from the legs, braces for taking the stress of tension imposed on the hopper by the legs, and a shaft for resisting torsional stresses imposed by the legs.

4. In a wagon, a hopper having dump doors at the bottom thereof, legs on two opposite sides of the hopper for supporting it, the hopper being arranged with a box-like portion and flared upper walls and transversely-extending centrally located brace members within the hopper attached at the ends thereof to the legs with a portion of the bracing members extending between the flared upper walls and another portion thereof extending between the box-like portion whereby a truss-like member is formed which has little interference with the discharge of the packed material from the box portion and which, by reason of its truss-like structure, is well adapted to carry the load imposed upon it.

5. In a wagon, a hopper, legs fastened one on each of two opposite sides of the hopper, and a bracing structure secured to the two opposite sides of the hopper and to the legs connecting the opposite sides of the hopper and the legs, the bracing structure being secured to the side walls of the hopper appreciably above the bottom thereof, the bracing structure being very thin in transverse dimension and high in vertical dimension and secured to the sides of the hopper beginning at a point appreciably above the bottom of the hopper and terminating appreciably below the top thereof whereby adequate bracing effect is afforded in the vertical plane and little resistance is offered to the flow of material from the hopper on discharging the material therefrom and whereby the material in the bottom of the hopper is not divided by the bracing structure.

6. In a wagon, a hopper, legs fastened one on each of two opposite sides of the hopper, and a bracing structure secured to the two opposite sides of the hopper and to the legs connecting the opposite sides of the hopper and the legs, the bracing structure being secured to the side walls of the hopper appreciably above the bottom thereof, the bracing structure being very thin in transverse dimension and high in vertical dimension and secured to the sides of the hopper beginning at a point appreciably above the bottom of the hopper whereby adequate bracing effect is afforded in the vertical plane and little resistance is offered to the flow of material from the hopper on discharging the material therefrom and whereby the material in the bottom of the hopper is not divided by the bracing structure.

ROY E. CHOATE.
HAROLD N. GRAVES
WILLIAM I. LEECH.